United States Patent Office 2,978,481
Patented Apr. 4, 1961

2,978,481

SYNTHETIC PROCESS FOR PRODUCING ALDEHYDES FROM ACRYLONITRILE BY OXO-REACTION

Jiro Kato and Hachiro Wakamatsu, Tokyo, and Hitoshi Ishiwara, Nishihemicho, Yokosuka, Japan, assignors to Ajinomoto Co., Inc., Tokyo, Japan, a corporation of Japan No Drawing. Filed Oct. 7, 1957, Ser. No. 688,439

Claims priority, application Japan July 31, 1957

2 Claims. (Cl. 260—465.1)

The present invention relates to the synthesis of β-cyanopropionaldehyde which is a useful intermediate compound for the synthesis of glutamic acid.

It is well known that olefines may be converted into aldehydes having one more carbon atom than the former, when reacted with carbon monoxide and hydrogen in the presence of cobalt carbonyl, such synthesis being called the oxo-reaction.

Hitherto known industrial processes for producing aldehydes by the oxo-reaction usually adopt benzene, toluene and other hydrocarbons as the solvent, and are almost always unsatisfactory, especially in cases where the products to be obtained are very unstable and the synthesis is apt to be accompanied by side-reactions.

The inventors have found that, if the oxo-reaction is carried out in polar solvents, such as alcohol, acetone, dioxane or "Cellosolve" which is monoethyl ether of ethylene glycol, the reaction velocity remarkably increases, side-reactions are avoided, the reaction mixture becomes stable and the aldehyde is prevented from polymerizing and thus much higher yields of the expected aldehyde are obtained. These advantages have been particularly observed in the synthesis of cyanopropionaldehyde from acrylonitrile, which aldehyde is particularly unstable.

According to H. Adkins et al. (J.A.C.S., vol. 71 (1949), page 3052, lines 25–34), acrolein, diethyl acetal, α-vinylfuran and acrylonitrile absorbed 50–75% of the amount of hydrogen and carbon monoxide required for complete hydroformylation. Apparently the desired reaction took place, but no aldehyde could be isolated from the reaction mixtures, although qualitative tests showed them to be present. It appeared that the aldehyde first formed underwent further reaction. Even such an unstable aldehyde as cyanopropionaldehyde, may be industrially produced with ease in much higher yield from acrylonitrile, if the reaction is carried out in accordance with this invention. Moreover, the reaction mixture is so stable that it may be stored for a considerable time.

No systematic study of solvent effects on the oxo-reaction has been reported. I. Wender et al., J. Am. Chem. Soc. 78, 5404 (1956), merely reported that they had found no marked differences among solvent effects in the case of the olefines of the hydrocarbon series. According to our studies, however, there are remarkable solvent effects on the oxo-reaction of such specific olefines as acrylonitrile, the reaction velocities varying in a wide range depending on the kind of solvents used and the formation of the desired aldehyde being considerably influenced in widely different degrees by adopting different solvents. For example, the reaction velocity in the oxo-reaction of acrylonitrile in acetone is three times that in benzene and, if isopropanol is used as the solvent, it is more than ten times that in benzene. On the contrary, when a hydrocarbon of normal chain series, e.g. ligroin, is used as the solvent, no cyanopropionaldehyde is obtained owing to its polymerization.

It will be clearly understood from the following table showing our experimental results that polar solvents such as alcohol, acetone, dioxane or Cellosolve generally predominate over hydrocarbon solvents in the oxo-reaction of acrylonitrile. The reaction velocity constants compiled in the table were determined from reactions carried out under the same conditions wherein 160 cc. of solution containing 20 g. of acrylonitrile, 1 mol percent thereof of cobalt carbonyl and each solvent listed below was charged into an autoclave of 300 cc. capacity, then pressurized to 150 kg./cm. with a gas mixture composed of carbon monoxide and hydrogen ($CO:H_2=1:1$) and heated at 120° C.

| Solvent | Velocity constant $k$ (min.$^{-1}$) |
|---|---|
| Benzene | 0.03. |
| Nitrobenzene | Decomposition of catalyst polymerization. |
| Ligroin | |
| Acetone | 0.09. |
| Methanol | 0.24. |
| Ethanol | 0.28. |
| n-Propanol | 0.42. |
| i-Propanol | 0.40. |
| n-Butanol | 0.40. |
| Sec-butanol | 0.07. |
| Ter-butanol | 0.016. |
| Dioxane | 0.08. |
| Methyl-Cellosolve | 0.50. |

In the case of tertiary butanol, which is a particular alcohol, the reaction velocity is lower than that in benzene. This is presumably due to steric hindrance, said solvent being considered to have some effects upon the mechanism of the oxo-reaction.

In general, the reaction velocities in the oxo-synthesis in the presence of the alcohols are extremely high as illustrated above. However, secondary of tertiary alcohols are preferred, in order to produce β-cyanopropionaldehyde directly, to primary alcohols, which have larger equilibrium constants for acetal formation. It is possible, however, to suppress the formation of acetals by the addition of a few percent of water to such alcohols as have relatively high equilibrium constants for acetal formation. Among the commercially available polar solvents including alcohols, isopropanol is the most preferred for the direct synthesis of β-cyanopropionaldehyde from acrylonitrile, since the reaction velocity is fairly high while the equilibrium constant is very small.

In general, reaction mixtures of oxo-reaction containing cobalt carbonyl have a marked tendency to cause polymerization of the formed aldehyde, even if oxygen be excluded, thus considerably lowering the yield of the desired compound, as those skilled in the art know well. If the oxo-reaction of acrylonitrile be carried out in polar solvents in accordance with this invention, however, the reaction mixture is extremely stable and no decrease of already formed aldehyde is encountered so long as oxygen is excluded. By way of example, when the reaction mixtures as described in the explanation of the foregoing table were left still in vessels from which air was excluded, the decreases of already formed β-cyanopropionaldehyde after 0.5, 2, 3, and 24 hours were found as follows:

| Solvent | 0.5 hr. | 2 hrs. | 3 hrs. | 24 hrs. |
|---|---|---|---|---|
| | Percent | Percent | Percent | Percent |
| Benzene | 3 | 9 | 10 | 25 |
| Isopropanol | 0 | 0 | 0 | 0 |
| Dioxane | 0 | 0 | 0 | 0 |

According to the hitherto known processes, immediate separation of the catalyst from the reaction mixture has been indispensable, in order to avoid decreasing the yield of aldehyde due to polymerization (e.g. cf. British Pat. No. 698,279). The high stability or storability of the reaction mixtures in accordance with this invention is one of the industrial advantages of this invention.

Still another advantage of this invention is the possibility of recovering the unreacted compound by means of distillation without accompanying appreciable loss of the formed aldehyde. Considering that such recovery was impossible in the hitherto known processes and that such a reaction can be hardly completed by nature, it is apparent that easy and inexpensive recovery of the unreacted material has an important significance in the industrial process.

The reason why the reaction mixtures obtained in accordance with this invention are so stable presumably resides in the fact that the polar solvents which are as Lewis' bases, react with cobalt carbonyl as formulated below and polymerization of formed aldehyde is therefore avoided.

$$3[Co(CO)_4]_2 + xB \rightarrow 2[Co(B)_x]^{++}[Co(CO)_4]_2^{--}$$

According to this invention, $\beta$-cyanopropionaldehyde CHO—CH$_2$—CH$_2$—CN which is a useful intermediate compound for the synthesis of glutamic acid, may be directly produced from acrylonitrile CH$_2$:CH—CN without the various accompanying disadvantages which have been inevitable in the hitherto known processes.

*Example 1*

An autoclave of 300 cc. capacity was charged with 160 cc. of acetone solution containing 20 g. of acrylonitrile and 1 mol percent thereon of cobalt carbonyl, then pressurized to 200 kg./cm. with a gas mixture of hydrogen and carbon monoxide (H$_2$ : CO = 1 : 1) and heated at 120–130° C. The yield of $\beta$-cyanopropionaldehyde was found to be 82% of the theoretical value. About 80% of the unreacted acrylonitrile was recovered by distillation under diminished pressure.

*Example 2*

A hydroformylation process was carried out under the same conditions as in the foregoing example, except that isopropanol was used as the solvent in lieu of acetone. The yield of $\beta$-cyanopropionaldehyde was found to be 78% of the theoretical value. About 78% of the unreacted acrylonitrile was recovered from the reaction mixture by mere distillation, losing only 0.3% of the formed aldehyde.

*Example 3*

The process was carried out under the same conditions as in Example 1 except that tertiary butanol was used as the solvent in lieu of acetone. The yield of $\beta$-cyanopropionaldehyde was found to be 79% of the theoretical value.

*Example 4*

Dioxane was substituted for acetone in the process of Example 1. The yield of $\beta$-cyanopropionaldehyde was 77% of the theoretical value.

*Example 5*

Methyl-Cellosolve was substituted for acetone in the process of Example 1. The yield of $\beta$-cyanopropionaldehyde was 51% of the theoretical value.

Having now particularly described and ascertained the nature of our said invention and in what manner the same is to be performed, we declare what we claim is:

1. The process for producing $\beta$-cyanopropionaldehyde which comprises dissolving acrylonitrile in an organic polar solvent selected from the group consisting of acetone, methanol, ethanol, n-propanol iso-propanol, n-butanol, sec-butanol, tertiary-butanol, dioxane and the monoethylether of ethylene glycol, and reacting the solution with carbon monoxide and hydrogen approximately in equal proportions at a temperature between approximately 120° C. and 130° C. and under a pressure of approximately 150 kg./cm.$^2$ to 200 kg./cm.$^2$ in the presence of cobalt carbonyl as a catalyst.

2. The process as in claim 1; wherein said polar solvent is iso-propanol.

References Cited in the file of this patent

UNITED STATES PATENTS

| | | |
|---|---|---|
| 2,549,454 | Gresham et al. | Apr. 17, 1951 |
| 2,610,203 | Hagemeyer et al. | Sept. 9, 1952 |
| 2,694,735 | Hull et al. | Nov. 16, 1954 |
| 2,831,029 | Vergilio et al. | Apr. 15, 1958 |

OTHER REFERENCES

Hagihara et al.: "Memoirs of the Inst. of Scientific and Industrial Research"; vol. 12, 1955, pp. 177–82.